United States Patent [19]
Nam et al.

[11] Patent Number: 5,711,693
[45] Date of Patent: Jan. 27, 1998

[54] PROCESS FOR FORMATION OF LARGE AREA FLAT PANEL DISPLAY USING SIDE JUNCTION

[75] Inventors: Kee-Soo Nam; Sin-Chong Park; Sang-Joon Park; Sang-Ho Kim, all of Daejeon, Rep. of Korea

[73] Assignee: Electronics and Telecommunications Research Institute, Daejeon, Japan

[21] Appl. No.: 357,019

[22] Filed: Dec. 16, 1994

[30] Foreign Application Priority Data

Nov. 29, 1994 [KR] Rep. of Korea ............ 94-31733

[51] Int. Cl.⁶ .................................................. H01J 9/18
[52] U.S. Cl. .................................................. 445/24
[58] Field of Search .................. 445/24, 25; 359/58, 359/62, 88; 348/383, 791; 451/54, 44

[56] References Cited

U.S. PATENT DOCUMENTS

| | | | |
|---|---|---|---|
| 4,156,833 | 5/1979 | Wey et al. | 345/80 |
| 4,408,836 | 10/1983 | Kikuno | 359/88 X |
| 4,820,222 | 4/1989 | Holmberg et al. | 445/24 X |
| 5,087,307 | 2/1992 | Nomura et al. | 451/44 X |
| 5,164,853 | 11/1992 | Shimazaki | 359/88 X |
| 5,347,292 | 9/1994 | Go et al. | 313/309 X |

*Primary Examiner*—Kenneth J. Ramsey
*Attorney, Agent, or Firm*—Larson and Taylor

[57] ABSTRACT

A process for formation of a large area flat panel display, and particularly a process for formation of a large area flat panel display using a side junction is disclosed, in which a large area is achieved by utilizing a side junction. More specifically, there is provided a process for formation of a thin film transistor liquid crystal display which can be used on all kinds of flat panel displays which uses glass as the substrate. The process for formation of a large area flat panel display utilizing a side junction according to the present invention includes the steps of: applying a side junction process on thin film transistor unit panels 2 so as to obtain a large area; and coupling a common electrode panel with said large area thin film transistor panel formed through said side junction process.

15 Claims, 5 Drawing Sheets

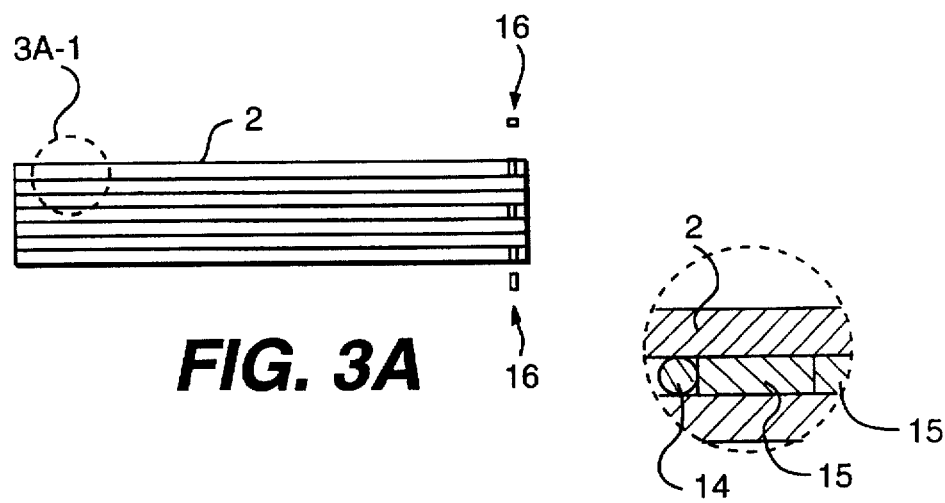
FIG. 3A
FIG. 3A-1
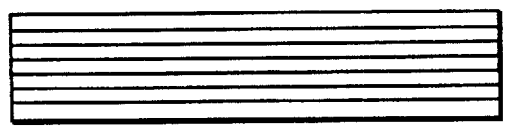
FIG. 3B
FIG. 3C
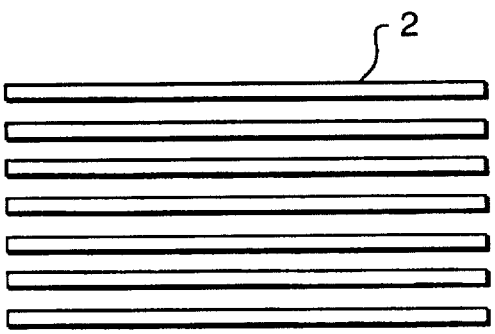
FIG. 3D ⇩

PROCESS FOR FORMATION OF LARGE AREA FLAT PANEL DISPLAY USING SIDE JUNCTION

FIELD OF THE INVENTION

The present invention relates to a process for formation of a large area flat panel display, and particularly to a process for formation of a large area flat panel display using a side junction, also called side-by-side alignment or called tiling, in which a large area is achieved by utilizing a tiled arrangement. More specifically, the present invention relates to a process for formation of a thin film transistor liquid crystal display which can be used on all kinds of flat panel displays which uses glass as the substrate.

BACKGROUND OF THE INVENTION

The technique of manufacturing the flat panel display (FPD) is important for the industries such as audio, video and computer industries.

Recently, the technique is applied to the portable computers, with the result that the demand for the technique has been increased.

In the year 2000 in which high quality televisions (HDTV) will be widely used, the demand for the flat panel display will exceed that for the cathode ray tube.

The types of flat panel displays include: PDP (plasma display panel), LED (light emitter diode), ECD (electro chromic devices), ELD (electro-luminescent display), FED (field emission display), and LCD (liquid crystal display). Among them, the most promissory next generation display is the liquid crystal display.

In accordance with the classification by the method of driving method, the liquid crystal display is classified into a simple matrix (SM), and an active matrix.

Particularly, of the active matrix, the liquid crystal display which uses the thin film transistor (TFT) has the feature of a high resolution, a high contrast, and a low power consumption, and therefore, it is currently used in note book type computers.

The thin film transistor liquid crystal display has been commercialized owing to its complete coloration and its high resolution. However, it is sold at a high price due to the high price of the manufacturing equipment and the low productivity.

Realistically the production yield is the key to the commercialization of the thin film transistor liquid crystal display.

Further, there is a limit to the adjustment of the particles, and the substrate uses glass which is thermally unstable. Therefore, it will be difficult to obtain a production yield of a 30-inch large screen thin film transistor liquid crystal display, and to commercialize it.

Currently, the most important matter in the manufacturing technique for the thin film transistor liquid crystal display is the manufacturing of the thin film transistor and the color filter.

In the manufacturing technique for the thin film transistor, the most important factor is the reduction of the manufacturing cost.

Currently, the major market for the thin film transistor liquid crystal display is the note book type computers, and the engineering work stations. However, the ultimate target market is the video apparatuses such as high prestige televisions.

The large screens such as those of over 20 inches currently require a projection type thin film transistor liquid crystal display.

However, this product suffers the problems of picture quality and occupation of a large space, and therefore, it cannot be applied to the screen of home HDTV.

If the HDTV is to achieve its original target, that is, if it is to furnish a real scene feeling and a high quality information, the screen has to be about 40 to 60 inches.

However, it seems to be impossible to achieve it with the current thin film transistor liquid crystal display.

Meanwhile, methods other than the thin film transistor liquid crystal display will scarcely wade across the above described technical barrier.

SUMMARY OF THE INVENTION

The present invention describes in detail how a panel with thin film transistors attached will be precision-processed, and how junctions or a tiling will be formed for achieving a large area.

Therefore it is the object of the present invention to provide a process for formation of a large screen flat panel display in which a new method called tiling is applied to form a large screen by using the currently known thin film transistor technique.

In achieving the above object, the present invention is constituted such that the unit substrates which have been manufactured by the existing manufacturing process for the thin film transistor are used to form a high quality large screen by applying the tiling technique.

Thus a technique is provided so that a high picture quality large area picture information display which is the urgent requirement of the flat panel display industry would have the maximum production yield so that there can be an early commercialization of it.

BRIEF DESCRIPTION OF THE DRAWINGS

The above object and other advantages of the present invention will become more apparent in the following detailed description of the preferred embodiment of the present invention with reference to the attached drawings in which:

FIGS. 1A and 1B illustrates the conception of the present invention, in which:

FIG. 1A is an exploded perspective view that is partly enlarged; and

FIG. 1B is a perspective view of the whole unit;

FIG. 3A is a schematic view which illustrates the molding process for the unit panels;

FIG. 3A-1 is an enlarged sectional view of the encircled portion of FIG. 3A.

FIG. 3B is a schematic view which illustrates the grinding process for the molded unit panels;

FIG. 3C is a schematic view which illustrates the polishing process after the grinding process;

FIG. 3D is a schematic view which illustrates the detaching process for the molder;

DESCRIPTION OF THE PREFERRED EMBODIMENT

Figure 1A:
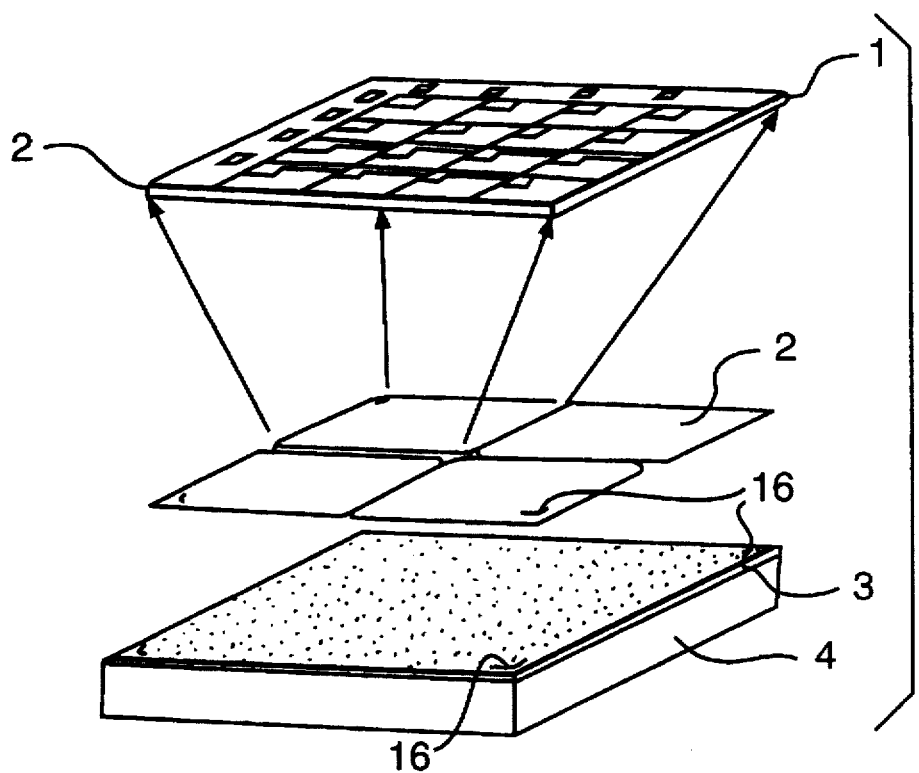
Figure 1B:
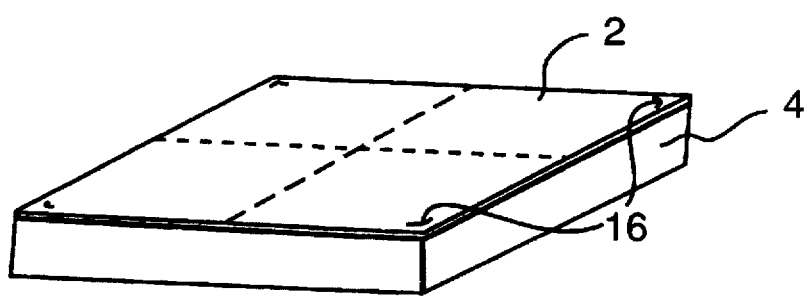

FIGS. 1A and 1B illustrates the conception of the present invention, and FIG. 1A is a partly enlarged exploded perspective view, while FIG. 1B is a perspective view of the whole unit.

Reference numeral 1 indicates an existing thin film transistor, and, in the formation technique for this thin film transistor 1, the positions of the pads are somewhat shifted, thereby producing a unit panel 2.

The pads are disposed on two sides of four unit panels 2 in different manners and on the other two sides of each of the four unit panels are electrical connections which together form an "L"-shape. That is, the positions of the pads for the four unit panels 2 are different. In this case, electrical connections between the unit panels 2 after the tiling process are not required.

If the electrical connections are easy, it is possible that more than 4 unit panels 2 can be tiled. After the sides of the unit panels are processed, an adhesive 3 is spread on a supporting glass 4, and then, four sheets of the unit panels 2 are made to undergo aligning and exposing process. In this way, a large flat panel display which is larger by 2 or 4 times the maximum size of the existing apparatus can be manufactured.

Of course, this display can be applied to other flat panel displays such as electric field emission display (FED).

Figure 2:
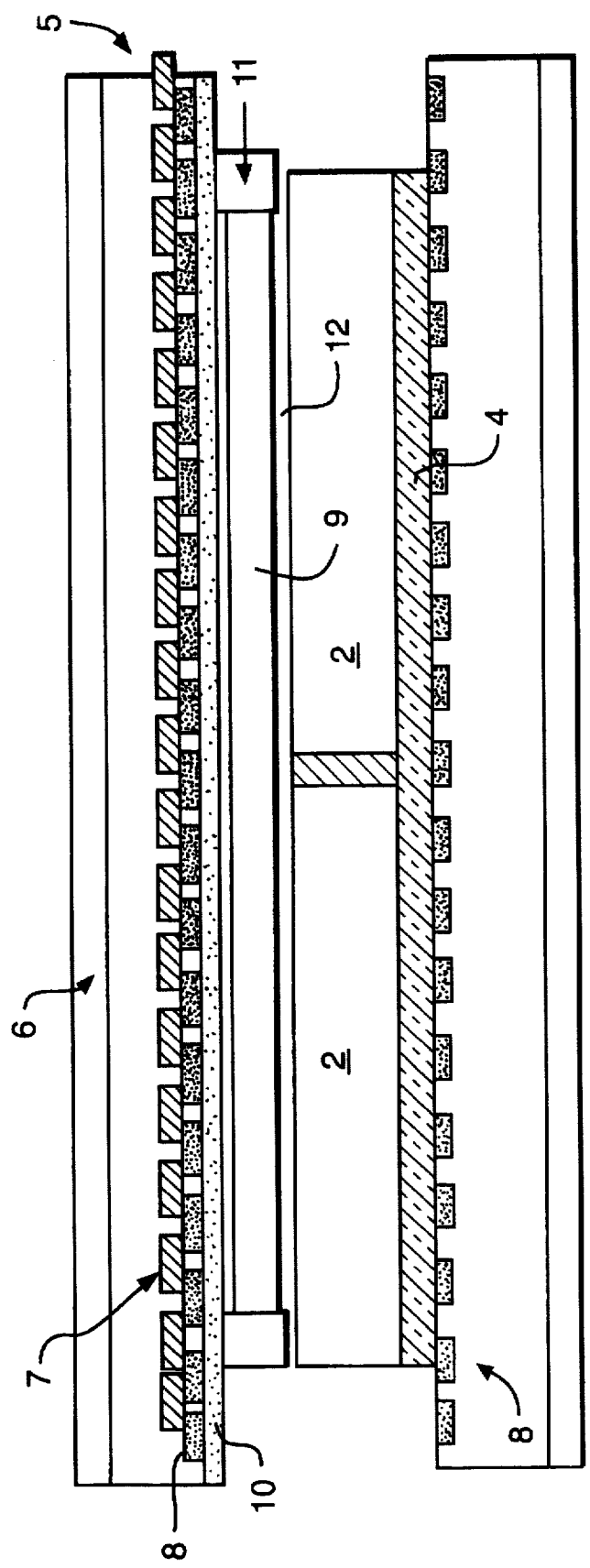
FIG. 2 is a sectional view of the thin film transistor liquid crystal display with the side junction method applied.
Figure 3E:
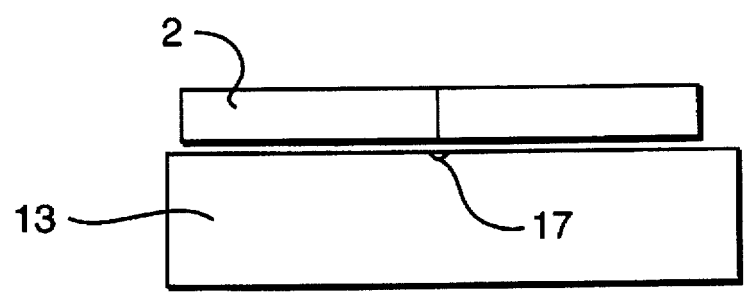
FIG. 3E is a schematic view which illustrates the arraying process.
Figure 3F:
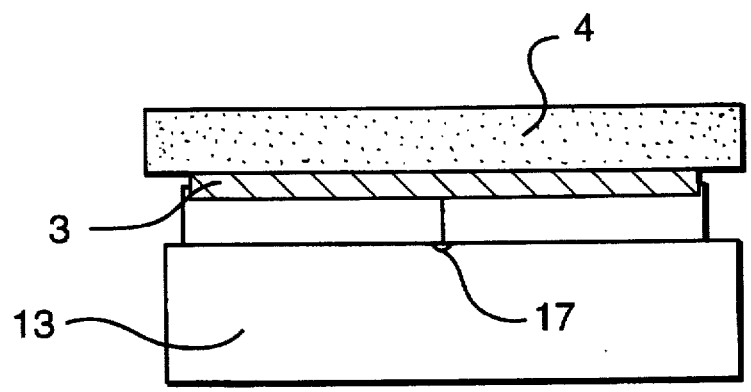
FIG. 3F is a schematic view which illustrates the adhesive spreading process.
Figure 3G:
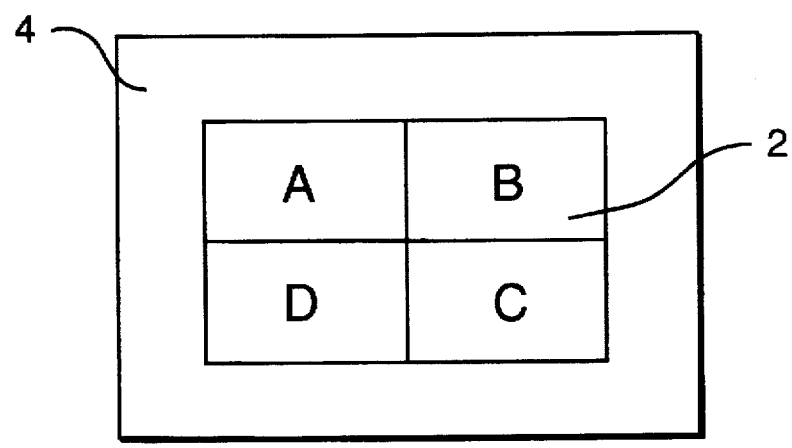
FIG. 3G is a plan view of the structure after exposing it to ultra-violet rays (with the lower plate for the 4-FET-LCD completed)
Figure 4:
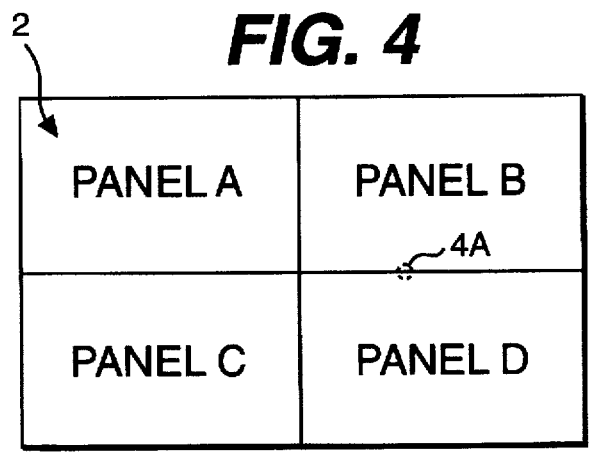
FIG. 4 is a schematic view which illustrates the defining of the junction portion.
Figure 4A:
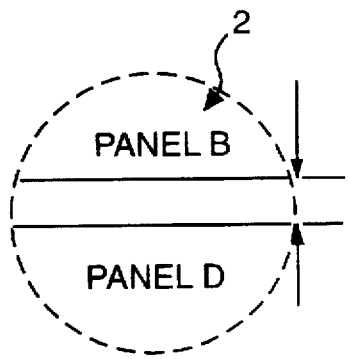
FIG. 4A is an enlarge schematic sectional view of the encircled portion of FIG. 4.

FIG. 2 is a sectional view of the thin film transistor liquid crystal display with the tiling method applied. Four sheets of the thin film transistor unit panels 2 are joined on the supporting glass 4 (only two of which are shown in FIG. 2). Of course, only two sheets of the unit panels 2 can also be joined, thereby assuring an area that is still larger than one sheet.

When two sheets of the unit panels 2 are joined together, the production yield is improved, because only the adjoining sides of the unit panels are processed.

The adhesive 3 which is used in the tiling process is an ultra-violet ray setting resin. Thus, a common electrode panel 5 is formed in which a large area color filter 7 is located in an upper panel being joined with the TFT panel. Of course, the common electrode panel 5 can be made to have a large area through the tiling process on a supporting glass 10.

At present, it is preferred that the thin film transistor unit panel 2 is made to have a large area. On the supporting glass 4, there are formed unit panels 2, aligning marks and a black matrix 8.

Other matters are same as those of the usual thin film transistor liquid crystal display.

The problems of the increase of the weight of the supporting glass 4 and the development of the joining equipment were solved by using very thin supporting glass 4 (0.7 mm).

The joining equipment was completed as a byproduct of the present invention. The specially devised apparatuses are a molder manufacturing machine, a grinding apparatus, a polishing apparatus, and an aligning and exposing apparatus.

As shown in FIG. 2, the module of the thin film transistor liquid crystal display includes two basic glass sheets 4 and 10.

On one side of the glass sheet 5, there is formed the thin film transistor, while spaced from it on a supporting glass 10 are formed the color filter 7 and the black matrix 8. A certain gap is formed between two panels, and a liquid crystal 9 is injected into the gap. Then a polarizing plate 6 and a driving circuit are installed, so that the module of the thin film transistor liquid crystal display would be formed.

In order to provide a large area of the thin film transistor unit panel 2, the present invention adopts a tiling process before assembling the common electrode panel 5.

The large area thin film transistor panel is coupled with the common electrode panel, thereby completing a large area liquid crystal product.

The module manufacturing processes such as the spreading of a polyimide layer 12, the rubbing, the printing of a sealing material layer 11, and the injection of liquid crystal are same as the post process for the general thin film transistor liquid crystal display.

FIGS. 3A to 3G illustrates the processing of the formed thin film transistor unit panels 2 by applying the junction process, so as to form a large area thin film transistor panel.

The formed thin film transistor unit panel 2 has to be subjected to several steps for carrying out a precision processing to a certain degree, and, for this purpose, marks 16 have to be put during the manufacturing of the unit panels.

The marks 16 are for cutting the glass, for overlapping the glasses, for processing the glasses, and for discriminating the center of the processing.

The terminating point for the processing is marked with a conventional material so as to form a predesignate, known pattern to indicate when the processing has been completed. This material is traced, and, when this material is detected, the processing is terminated.

In the process of FIG. 3B, a plurality of glass sheets are processed simultaneously, so that the productivity would be improved. Then an aligning mark which is set when designing the thin film transistor unit panel 2 is put, thereby stacking the glass sheets.

Then, first, one panel is fixed using a tentative adhesive 15, and then, a next panel is aligned by utilizing a closed circuit camera and a precision stage.

Bead shaped spacers 14 which are highly uniform are spread between the thin film transistor unit panels 2, and then, the panels are overlapped.

The overlapping number of the sheets are arbitrary between 20 to 100 sheets. The aligning error is about several micro meters. After the overlapping, an optical paraffin is inserted into between the panels at a low temperature of below 80° C.

Under this condition, the applied pressure is 0.2 to 1 kg/cm$^2$.

Then paraffin is filled into the bottom, and a cooling is carried out slowly at the normal temperature.

The overlapped structure (to be called molder below) consisting of several scores of panels is subjected to a glass processing step up to the point where the processing mark is put.

This processing is carried out in three steps.

FIG. 3B illustrates the grinding of the first and second steps.

First, a processed molder is formed by using a ceramic powder of below No. 200. Under this condition, the processing face is two, and therefore, the rectangularity and the flatness between the two faces are carefully adjusted.

While processing the glass sheets, the processing state is observed with a microscope.

In the case where a precision tool is attached for processing the molder, the need for observing the processing state is eliminated.

After processing with the No. 200 powder, a precision grinding is carried out by using a powder of No. 1200. During this process, all the processing precisions are determined.

Then a processing with a precision which is equivalent to that for the lens processing is carried out using a polishing material.

FIG. 3C illustrates the polishing process.

The flatness and the rectangularity are measured by using the Newton interferometer and the laser rectangle meter respectively. If the interference pattern shows a perpendicularity, then it is judged that the processing of the side of the glass sheet is completed.

In this process, during the manufacturing of the molder, if a sufficient pressure is not applied, then the edges of the respective unit panels are damaged.

After the completion of the processing, the molder is subjected to a detachment process. The detachment process is carried out at a temperature of below 100° C.

The chemicals which are used for the detachment process are the solvents for the tentative adhesive 15 (which is used during the manufacturing of the molder) and the optical paraffin. Thus the tentative adhesive and the optical paraffin are removed.

The detachment process was carried out at a solvent temperature of over 50° C., and, in order to promote the speed of the detachment, a vessel with an ultra-sonic apparatus installed thereon was used.

However, if the ultra-sonic energy is too high, damages can be caused to the thin film transistors, and therefore, a proper ultrasonic power has to be used.

However, the detachment becomes faster, the higher the temperature and the higher the ultra-sonic power.

The detached respective unit panels 2 are subjected to an aligning process subsequent to a conventional washing process. The standard work station for the aligning process is composed of quartz which has a thermal expansion coefficient of almost zero.

A quartz plate 13 of the standard work station is provided with a vacuum chuck, vacuum level adjuster and a vacuum measuring meter, so that a vacuum can be established for each of the four unit panels 2.

Further, in order to minimize the stepped difference between the panels, the quartz plate 13 having the vacuum chucks is made to undergo a precision processing which has the same level as that of the optical standard. This quartz plate 13 in which the vacuum chuck is installed allows infrared rays to pass through.

The aligning order is as follows.

That is, first, two unit panels 2 are aligned by taking into account the processing faces of other panels, and they are made to be fixedly secured by utilizing the vacuum chuck.

During the aligning, in order to prevent the damages of the thin film transistor due to the contact between the quartz plate 13 and the unit panel 2, an electrostatic preventing apparatus is used.

After aligning the two unit panels, other two panels are aligned while observing them by means of a microscope.

The quartz plate 13 in which the vacuum chuck is installed is provided with marks for aligning with the unit panels.

Further, in order to prevent the spreading of the leaked adhesive after leaking through the junction, grooves 17 are formed on the quartz plate 13.

After the completion of the aligning, the unit panels are heated to 50° C.

The heating is carried out by using an infrared ray lamp.

When it reaches the desired temperature, an ultra-violet ray adhesive is spread on the cross-shaped junction portion.

After spreading of the adhesive, the spilled adhesive 3 remaining on the periphery is wiped off, and then, it is exposed to an infrared ray lamp.

After the completion of the exposure, spacers are spread for adjusting the amount of the adhesive, and then, the ultra-violet ray adhesive 3 is spread on the whole area of the four unit panels.

Thus the supporting glass 4 with the aligning mark and the black matrix provided is attached.

During the process, a certain level of pressure is applied so that bubbles would not be formed. Then ultra-violet rays are irradiated, and then, a sufficient cooling is carried The large area thin film transistor panels are sufficiently left exposed to weak ultra-violet rays.

This process is carried out for relieving the stress accumulated between the panels, and between the adhesive 3 and the supporting glass 4.

Thus the lower panel 2 for the thin film transistor liquid crystal display is manufactured, and this lower panel 2 is coupled with the common electrode panel 5 (in which the color filter and the black matrix are installed) by applying the general liquid crystal manufacturing process.

The technical matter which is most important in manufacturing the large area thin film transistor panel is the defect in the junction portion.

The minimizing of this defect is the target of the present invention.

A first kind of this defect is a gap formed in the junction portion. This gap should be such that human eyes cannot discriminate it at a certain distance.

The line width of the black matrix for the thin film transistor liquid crystal display for the 10-inch note book type computers is 20 to 30 micro meters. The gap of the junction portion should be smaller than the line width of the black matrix. This value of the gap has a larger tolerance in larger pictures, and therefore, it is advantageous in larger screen.

Another defect is a steeply stepped difference which is formed in the junction portion of the thin film transistor device, and which can be found when observing the junction portion through a sectional view.

Figure 5:
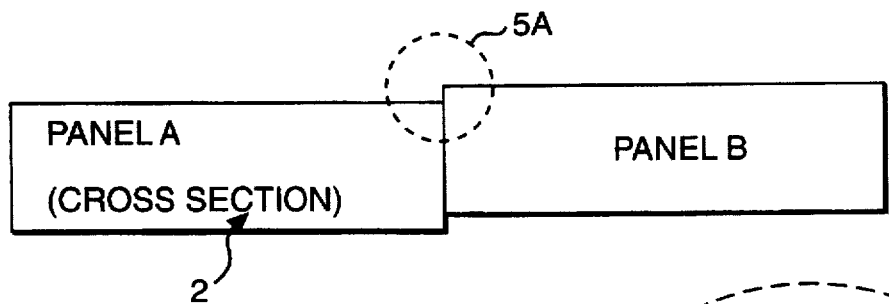
FIG. 5 is a schematic view which illustrates the defining of the stepped difference of the junction portion.
Figure 5A:
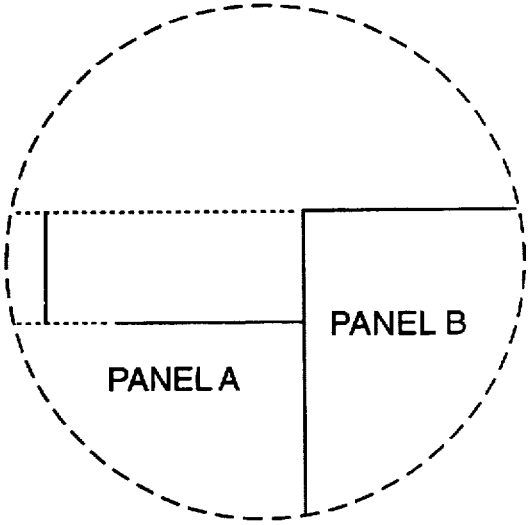
FIG. 5A is an enlarged schematic sectional view of the encircled portion of FIG. 5.

The definition of the stepped difference of the junction portion is illustrated in FIG. 5.

This value has an absolute meaning in determining the picture quality of the liquid crystal display. If this value amounts to over several micrometers, the two or four liquid crystal displays display a different color information and a different contrast, with the result that the meaning as a display is lost.

The stepped difference should be small as far as possible. With a liquid crystal thickness of 5 micrometers, a stepped difference of 0.1 micrometers may be tolerable.

What is claimed is:

1. A process for formation of a large area flat panel display utilizing tiling, comprising the steps of:

applying a tiling process on a plurality of thin film transistor panels so as to obtain a large area;

joining a supporting glass to one surface of said large area thin film transistor panels formed through said tiling process; and coupling a common electrode panel with another surface of said large area thin film transistor panels formed through said tiling process;

wherein said supporting glass is provided with aligning marks and a black matrix, whereby defects on the tiling portion are reduced due to a scattering of light.

2. A process for formation of a large area flat panel display utilizing tiling, comprising the steps of:

applying a tiling process on a plurality of thin film transistor unit panels so as to obtain a large area, wherein prior to joining said unit panels to a supporting glass, a plurality of unit panels are overlapped by utilizing a plurality of molder manufacturing aligning marks, then inserting ultra-precision spacers between said unit panels, and then fixing said unit panels by using a temporary adhesive; and coupling a common electrode panel with said large area thin film transistor panels formed through said tiling process.

3. The process as claimed in claim 2 wherein prior to joining said unit panels to the supporting glass, a pressure is applied on said unit panels that have been fixed by means of said temporary adhesive, then a paraffinic material is inserted at a low temperature, and a slow cooling is carried out, thereby manufacturing the molder.

4. The process as claimed in claim 3, wherein prior to joining said unit panels to the supporting glass, the detachment of said molder is carried out at a temperature of below 100° C., using solvents for paraffin and the temporary adhesive, and utilizing an ultra-sonic apparatus for promoting the speed of detaching said molder.

5. The process as claimed in claim 4, wherein the aligning work for the side processed unit panels 2 is carried out by using a quartz plate that has a low thermal expansion coefficient for maintaining a fixed density, installing vacuum chucks to obtained a vacuum independently for each of the unit panels, and installing a vacuum level adjuster and a vacuum measuring meter.

6. The process as claimed in claim 5, wherein said quartz plate with said vacuum chuck installed is marked with aligning marks for joining said unit panels 2.

7. The process as claimed in claim 6, wherein, in order to prevent the formation of bubbles between said unit panels, heat is applied, said supporting glass is covered, and pressure is applied.

8. The process as claimed in claim 6, wherein, in order to prevent the leakage of the adhesive, the joining part of said quartz plate is spread with an adhesive only on the joining portion, then waiting until said adhesive has penetrated before irradiating with ultra-violet rays.

9. The process as claimed in claim 8, wherein the flatness and rectangularity of the joining portions between said unit panels and said quartz plate are measured respectively by using a Newton interferometer and a laser rectangle measuring meter, and the stepped difference is monitored through the interference pattern between said unit panels and said quartz plate.

10. A process for formation of a large area flat panel display utilizing tiling, comprising the steps of:

applying a tiling process on a plurality of thin film transistor unit panels so as to obtain a large area, wherein a large area for a common electrode panel with a color filter and a black matrix installed thereon is achieved by utilizing a tiling process which is used for achieving a large area for said thin film transistor unit panels; and coupling a common electrode panel with said large area thin film transistor panels formed through said tiling process.

11. The process as claimed in claim 10, wherein the aligning work for the side processed unit panels is carried out by using a quartz plate that has a low thermal expansion coefficient for maintaining a fixed density, installing vacuum chucks to obtain a vacuum independently for each of the unit panels, and installing a vacuum level adjuster and a vacuum measuring meter.

12. The process as claimed in claim 11, wherein said quartz plate with said vacuum chuck installed is marked with aligning marks for joining said unit panels.

13. The process as claimed in claim 12, wherein, in order to prevent the leakage of the adhesive, the joining part of said quartz plate is spread with an adhesive only on the joining portion, then waiting until said adhesive has penetrated before irradiating with ultra-violet rays.

14. The process as claimed in claim 13, wherein the flatness and rectangularity of the joining portions between said unit panels and said quartz plate are measured respectively using a Newton interferometer and a laser rectangle measuring meter, and the stepped different is monitored through the interference pattern between said unit panels and said quartz plate.

15. The process as claimed in claim 12, wherein, in order to prevent the formation of bubbles between said unit panels, heat is applied, said supporting glass is covered, and pressure is applied.

* * * * *